United States Patent [19]

Morse

[11] 4,046,361
[45] Sept. 6, 1977

[54] IMPACT ENERGY ABSORPTION DEVICE
[75] Inventor: Robert L. Morse, Crossett, Ark.
[73] Assignee: Mechanisms, Inc., Crossett, Ark.
[21] Appl. No.: 599,782
[22] Filed: July 28, 1975
[51] Int. Cl.² .............................................. F16F 7/10
[52] U.S. Cl. .................................................. 267/139
[58] Field of Search .............. 267/136, 139, 119, 116; 293/39, 66, 74, 84; 114/219; 61/48

[56] References Cited
U.S. PATENT DOCUMENTS

| | | | |
|---|---|---|---|
| 1,726,191 | 8/1929 | Peacock | 293/84 |
| 3,311,397 | 3/1967 | Ramsey | 267/139 |
| 3,459,004 | 8/1969 | Morini | 267/139 |
| 3,585,958 | 6/1971 | Naczkowski | 61/48 |
| 3,834,686 | 9/1974 | Moritz et al. | 293/84 |

FOREIGN PATENT DOCUMENTS

| | | | |
|---|---|---|---|
| 264,633 | 12/1964 | Australia | 293/84 |
| 1,801,342 | 5/1970 | Germany | 267/139 |

Primary Examiner—James B. Marbert
Attorney, Agent, or Firm—Brisebois & Kruger

[57] ABSTRACT

Device for cushioning the impact of an approaching article comprises a lever arm adapted to be attached to shock absorbing means and extend across the path of travel of the article, said arm having a surface on the side nearest the article so curved that the distance between the point of impact of the article against the lever and the point of attachment of the lever to the shock-absorber decreases as the article advances after first contacting said lever.

7 Claims, 6 Drawing Figures

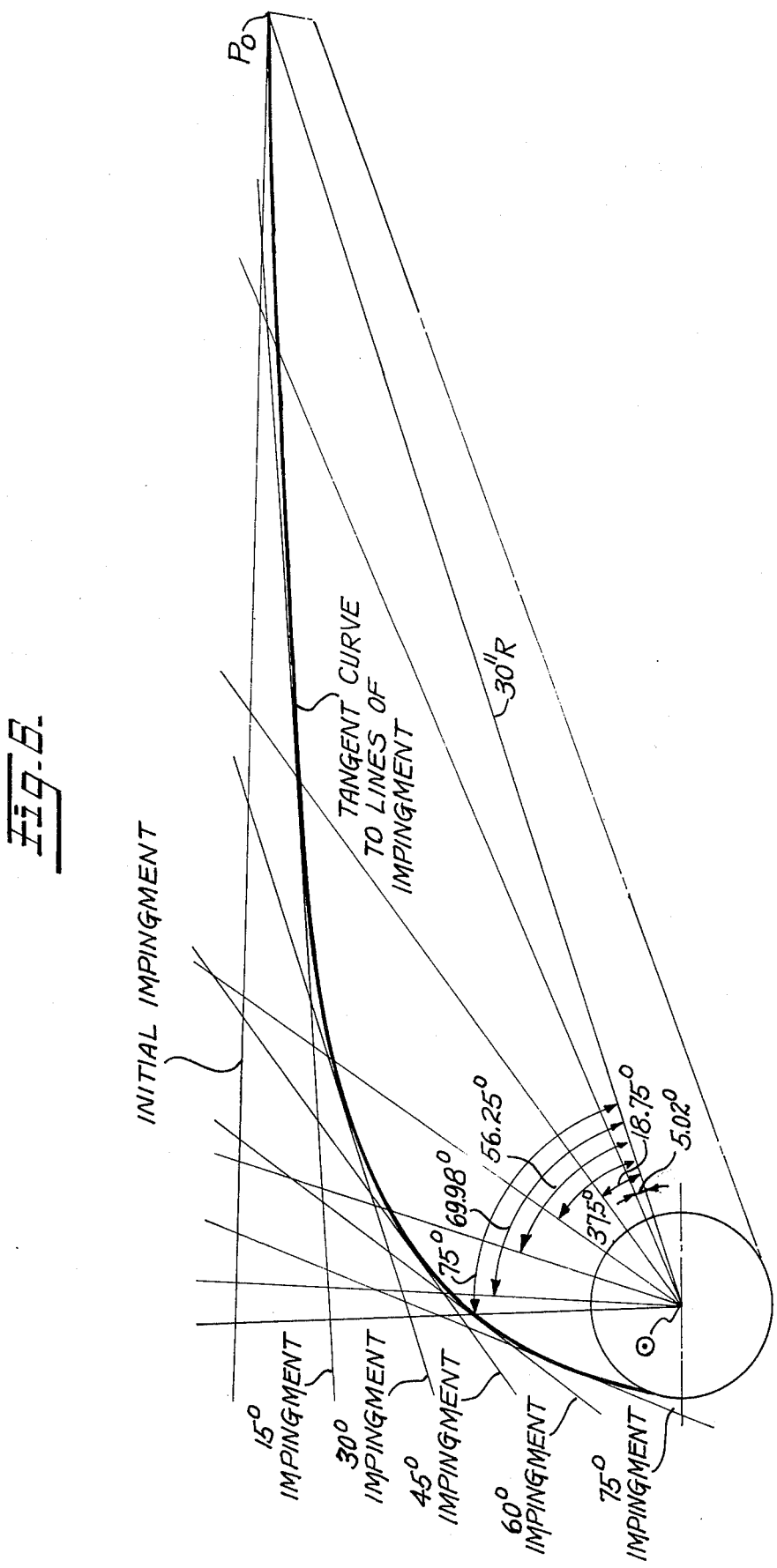

IMPACT ENERGY ABSORPTION DEVICE

SUMMARY OF THE INVENTION

This invention relates to a device for absorbing energy adapted to cushion the impact of an article against a surface equipped with said device. The object of the invention is to provide a device in which:

A. The noise produced at impact is reduced.
B. Damage to the object itself, its contents, or the target the object hits is reduced.
C. Bounce - back of the object is eliminated or reduced.
D. Spatial positioning of the object is enhanced.
E. Shock to surroundings is reduced.
F. Safety to personnel in the impact area is increased.
G. Cost of maintaining the impact area due to damage from repeated collisions is reduced.

In order to design a device attaining these objectives, two factors must be taken into account:

1. The kinetic energy of the moving body, and
2. The distance involved in bring the body to a halt.

In all cases it may be shown that the de-acceleration of the moving body should proceed from a null value at initial impact sinusoidally to a null value at its point of rest. This is the condition, for example, of a swinging pendulum in which its kinetic energy at the bottom of its swing is converted to potential energy at the top of its swing, as it is brought gently to a halt.

In one embodiment of the device according to my invention the energy converted to potential energy is actually absorbed sinusoidally by a device acting like a pendulum and producing the same overall effect.

In other cases, sine absorption of energy may be less preferred than other mathematically defined methods because of the particular application. In these events, the device may be shaped in such fashion to give linear, parabolic, or cycloidal absorption of energy, or combinations thereof including sine absorption to produce required results; in effect, the device whether used as a bumper, say on an automobile, or as a stop for an oncoming object, can produce the effects mentioned under A-G above. The device may also produce sine, parabolic, hyperbolic, elliptical, logorithmic, cycloidal or linear variations in the stopping distance required to stop a body moving with a given kinetic energy.

The essential feature to produce the foregoing results is that a moment arm through which impact pressure is applied to a linear de-accelerator be so proportioned as to reduce the full impact energy to a prescribed value, usually zero, through a specified energy consumption function by varying the effective length of the moment arm to suit the prescribed conditions. This is accomplished by continually varying the impact point from initial to final positions so that the energy absorption or stopping distance varies as required.

The linear de-accelerator may be any commercially available shock absorber with either constant or variable recoil characteristics. These are available with adjustable energy response characteristics, heat dissipators, and other accessories which are customized for particular applications.

A preferred embodiment of my invention will now be described, with reference to the accompanying drawings in which:

FIG. 6 is a sketch illustrating a second step in calculating the curvature of said impact-receiving surface.

The drawings show a pair of impact-cushioning devices mounted on a common frame, but it will be appreciated that a single device may be used under some circumstances.

Figure 1:
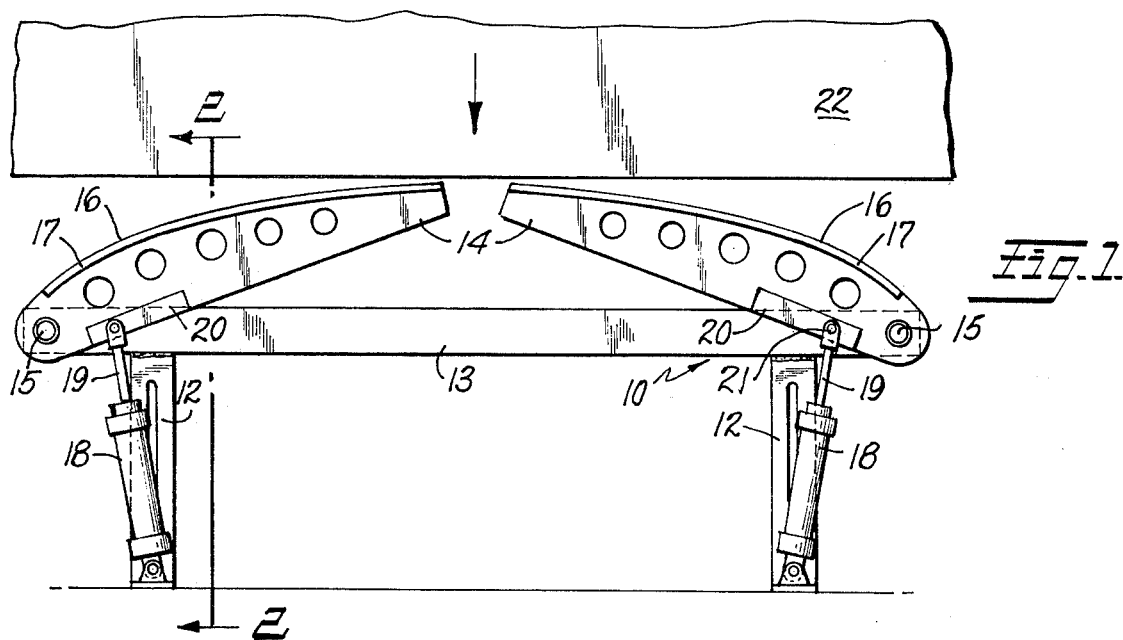
FIG. 1 is a plan view showing one embodiment of my impact cushioning device just before it is struck by a plywood panel, the impact of which is to be cushioned.
Figures 2, 3:
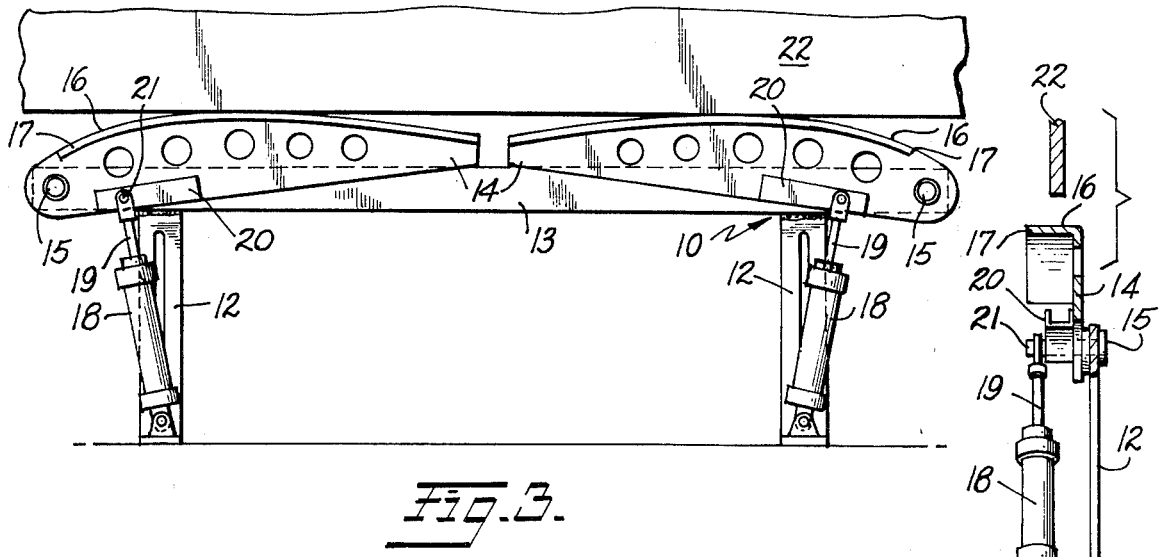
FIG. 2 is a plan view showing the same device shortly after it has been struck by the panel.
FIG. 3 is a plan showing the same device after the panel has been brought to a halt.
Figure 4:
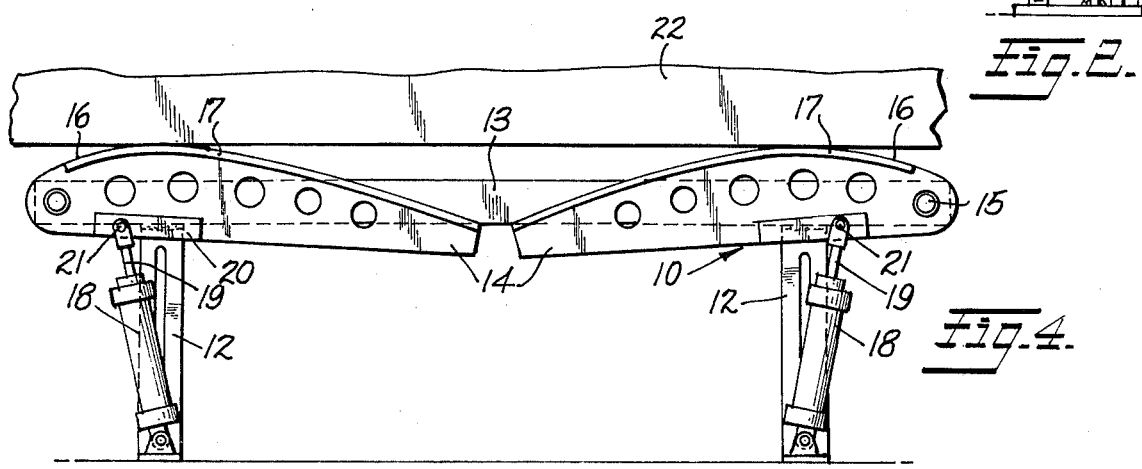
FIG. 4 is a side view of the device as shown in FIG. 3.

As best seen in FIG. 1, a frame 10 fixed to a supporting surface 11 comprises two generally parallel arms 12 intersecting a cross bar 13. At each end of the cross bar 13 one of two levers 14 is mounted to pivot about a pin 15. These levers have curved impact-receiving surfaces 16 which may be widened by providing appropriate flanges 17 on the levers. In the particular embodiment illustrated the surfaces 16 have a curvature such that the engagement between these surfaces and the panel, as the levers swing, is essentially a rolling rather than a sliding action. The swinging movement of the levers 14 is resisted by a pair of conventional shock-absorbers 18. The cylinder of each shock-absorber is attached to one of the parallel arms 12, and its rod 19 is connected to a flange 20 on the lever. The connection 21 between the piston rod 19 and the flange 20 must be pivotal, and means may be provided for adjusting the position of this connection along the length of the flange.

It will be appreciated that when the panel 22 first contacts the levers the distance between the points of contact and the pivot pins 15 is far greater than the difference between the connection 21 of each lever to the piston rod and the respective pivot pin 15, so that the resistance to further movement of the panel is at its minimum.

As the panel moves further toward the shock-absorbers, the points of contact between the panel and levers approach the pivot points 15, and the proportion of the resistance which the shock-absorbers are capable, which is actually applied to the panel, increases proportionally.

By varying the position of the point at which each piston rod is connected to its swinging lever, the length of the lever, the curvature of the impact surface, and the capacity and response pattern of the shock-absorber, an almost infinite variety of cushioning effects adapted to particular applications may be obtained.

Two representative examples showing how the curvature of the impact-receiving surfaces may be calculated are given below.

EXAMPLE A: Sinusoidal displacement

In this example, let $v_o$ be the point velocity of an impinging object of mass "M" about to be stopped in a distance "S" such that after impact the body is constrained to move in such fashion that if $s$ is its distance after impact and time $t_o$, then:

$$s = S \sin \omega t, \quad (1)$$

Equation (1) thus defines sinusoidal stopping in which $\omega$ is a constant angular velocity and $t$ is the time measured from $t_o$.

By differentation with respect to $t$, $$ds/dt = s\, \omega \cos \omega t. \quad (2)$$

The kinetic energy of the body to be stopped is Eo, so that:

$$E_o = 1/2\, M\, V_o^2 = \text{const.} \quad (3)$$

Let $E$ represent the kinetic energy at sometime $t > t_o$. In the interval between $t = t_o$, energy may or may not be added to Eo. For example, should the object be on a conveyor, it is probable that the conveyor will continue to run and through frictional forces tend to add energy to the system. Should the object be an automobile, say, chances are good that a braking force will be applied and energy will be extracted through extraneous means; consequently, only a value of Eo is treated herein. The methods given, however, allow a decrement or increment as particular circumstances require.

At sometime $t$ then, based on previous development, the object has a kinetic energy of $e$ such that $$e = 1/2\, M\, V^2 \quad (4)$$

By substitution from Equation (2), $$e = 1/2\, M\, S^2\, \omega^2 \cos^2 \omega t. \quad (5)$$

At time $t_o = 0$, $\cos^2 \omega t = 1$. Thus, there being no energy absorption, $e = Eo$.

Equation (5) then requires that:
(6) $e = Eo = \tfrac{1}{2} M V_o^2 = \tfrac{1}{2} M S^2 \omega^2$ or that $$S^2 w^2 = V_o^2 \quad (7)$$

$$\omega = \pm (V_o/S) \text{ rads./sec.} \quad (8)$$

If $\omega$ is positive, then viewed in plan, $\omega$ is the constant counter-clockwise rotation of a vector, magnitude $S$, rotating about a line passing through the point of initial impingment and parallel to the front of the object.

If now sinusoidal displacement is to be followed, the difference between initial energy Eo and $e$ must at anytime $t$ be the energy absorbed by a selected energy absorption device. This quantum of energy is designated as $\Delta e$.

$$\Delta e = Eo - e = \tfrac{1}{2} M V_o^2 = \tfrac{1}{2} M S^2 \omega^2 \cos^2 \omega t \quad (9)$$

By slight simplification, $$\Delta e = Eo\, [1-\cos^2 \omega t] \quad (10)$$

or, since
$\sin^2 \omega t = 1-\cos^2 \omega t$, $$\Delta e = Eo \sin^2 \omega t. \quad (11)$$

Equation (11) shows the absorbed energy as a function of $t$. As to be developed later, the curvature of the arm with a given absorber will be determined. So far, however, all concepts have had to do primarily with energy. It is also necessary to evaluate forces.

At a time $t$ such that $t_o < t \leq \pi/2$ the energy in the impinging mass is its initial energy less that absorbed from Equation (11), the remaining energy in $e$, designated as $e_R$ is:

$$Eo - \Delta e = e_R = Eo - Eo \sin^2 \omega t \text{ or,} \quad (15)$$

$$e_R = Eo \cos^2 \omega t. \quad (16)$$

Obviously the only remaining energy in $e_R$ is given by $$E_R = \tfrac{1}{2} M V^2 \quad (17)$$

By equating (16) and (17), $$\tfrac{1}{2} M V^2 = \tfrac{1}{2} M V_o^2 \cdot \cos^2 \omega t \quad (18)$$

$$V^2 = V_o^2 \cdot \cos^2 \omega t \quad (19)$$

$$V = \pm V_o \cos \omega t. \quad (20)$$

By differentiation with respect to $t$, $$(dv/dt) = \pm V_o \omega \sin \omega t. \quad (21)$$

From Newton's Law, the force F is:

$$F = M(dv/dt) \quad (22)$$

By substitution, $$F = -M V_o \omega \sin \omega t. \quad (23)$$

Energy check: The absorbed energy plus the remaining energy must at all times equal the initial energy $E_o$. By adding equations (11) and (16), $$E_o \sin^2 \omega t + E_o \cos^2 \omega t = E_o \quad (24)$$

$$(\sin^2 \omega t + \cos^2 \omega t) = 1 \quad (25)$$

$$1 = 1 \text{ Q.E.D.}$$

The shock absorber to absorb $E_o$ has been predicated to be linear. This means that if a rotary absorber is used, the absorbed energy is proportional to the angular rotation such that $$\Delta e = K \cdot \theta \quad (26)$$

$K$ is a proportionally constant so chosen that $\Delta e \geq E_o$ when the angle $\theta$ reaches its maximum value $\theta_f$. $\theta_f$ is arbitrary and is determind by prudent consideration of available space, etc., of a particular application. The same consideration stands if the units of $K$ are changed so that $$\Delta e = K \cdot X \quad (27)$$

where $X$ represents the travel of a piston type shock absorber.

Using a rotary absorber for illustration, by equating Equations (11) and (26), $$K \theta = E_o \sin^2 \omega t \text{ or} \quad (28)$$

$$\theta = (E_o/K) \sin^2 \omega t. \quad (29)$$

The total time taken from initial impact to final rest depends on $\omega t$. When $\omega t = \pi/2$, recalling (8), $$(V_o/S)\, t_f = \pi/2$$

$$t_f = \frac{\pi \cdot S}{2 \cdot V_o} = 1.5708 \left(\frac{S}{V_o}\right) \text{sec.} \quad (30)$$

Equations (30), either (27) or (29), (23), (11), and (1) give collectively all information necessary for design of an energy absorption device previously described.

A specific example utilizing reasonable values is now given for illustration.

GIVEN: A mass of 4,000 lbs. moving at a speed of 5 MPH with no braking or accellerating forces to be stopped in 8 inches such that the movement of the mass after impact shall be sinusoidal within its stopping distance.

REQD.:
A. The curvature of the arm or arms for this application. (Two assumed)
B. Determine time for stopping.
C. Determine max. forces involved.
D. Select a shock absorber for the given application.
E. Determine the total angle of swing of the arm, $\odot_f$.

Figure 5:
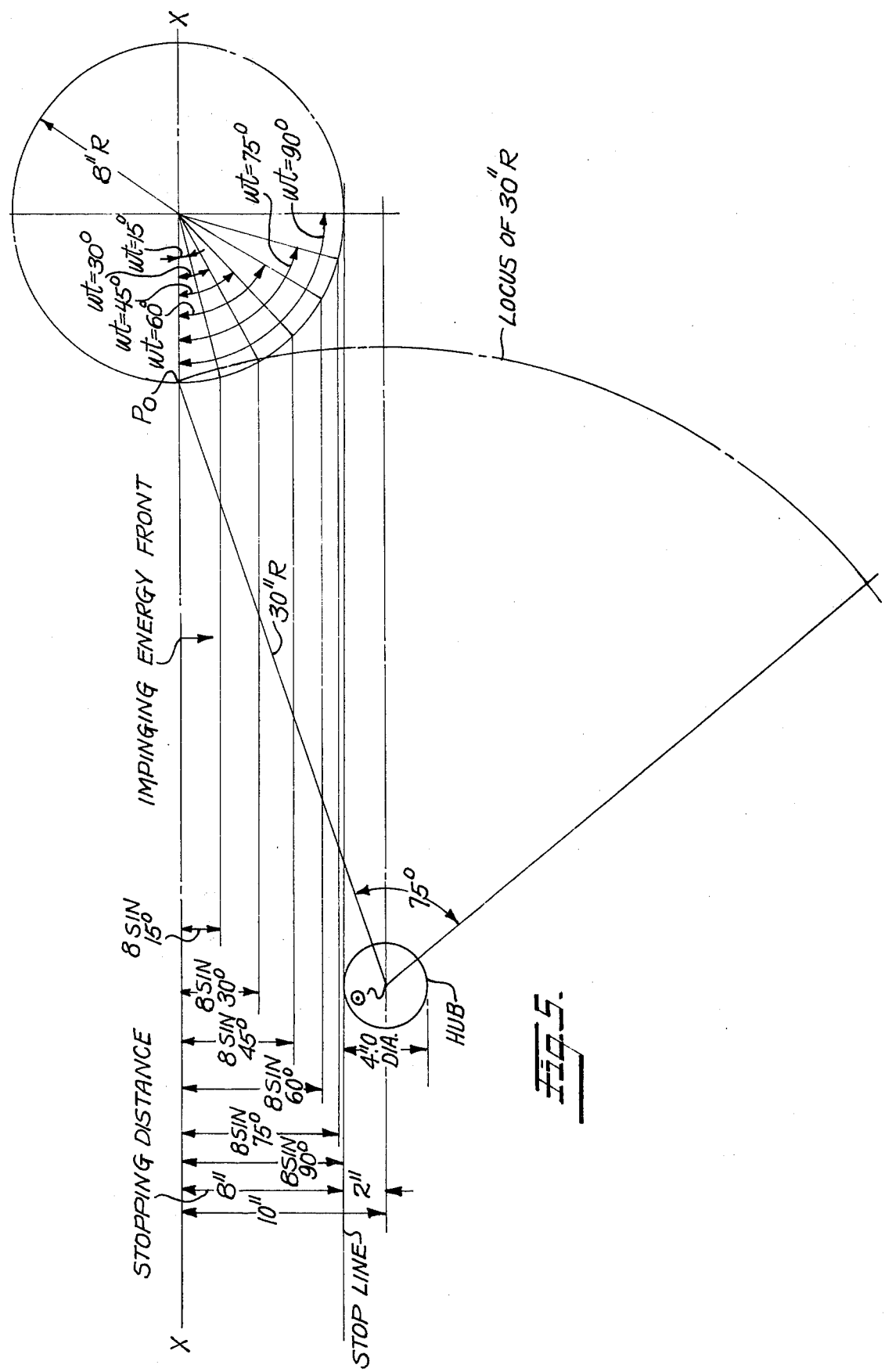
FIG. 5 is a sketch illustrating a first step in calculating the curvature of the impact-receiving surface of an impact-cushioning device according to the invention.

Reference is now made to FIG. 5 of the accompanying drawings. In FIG. 5, let the radial distance about a point ⊙ be 30 inches. Let the diameter of a hub about ⊙ be 4 inches. Let a line through ⊙ be constructed parallel to a line representing the impinging front of the on-coming object. The distance between these two parallels is 10 inches, one-half the hub dia. plus the stopping distance. Let the intersection of the arc described by the 30 inches radius and the parallel 10 inches from ⊙ be designated as $P_o$. This is the point of initial impact. On the one which contains $P_o$, construct a circle of 8 inch radius using the parallel through $P_o$ as a diameter and as X—X axis as shown. Imagine now a vector rotating counter clock-wise about the center of this 8 inch radius circle at a speed of $\omega$ radians per sec. Let $t_f$ be divided into $n$ parts. For illustration, $n$ will be taken as 6. Thus, $n$ represents 15° of included arc. Parallel lines drawn through the points at 15° intervals on the 8 inch circle then describe sucessive positions of the on-coming object in accordance with equation (1), i.e., $$s'' = 8 \sin \omega t$$

Calculations now follow:
From Data Given:

$$E_o = \frac{4000}{32.2} \times \tfrac{1}{2} \times \left(\frac{5 \times 5280}{3600}\right)^2 = 3340.28 \text{ ft. lbs.}$$

As $E_o$ is total energy, two arms assumed, then per arm, $$E_o = \tfrac{1}{2}(3340.23) = 1670.12 \text{ ft.-lbs.}$$

From Equation (30)

$$t_f = 0.15708 \times (8/12/7\tfrac{1}{3}) = 0.1428 \text{ sec.}$$

From Equation (23), the max. force involved is, $$F = -\frac{2000}{32.2} \times 7.333 \times \frac{7.333}{8/12} \text{ lbs.}$$

$$F = -5009.90 \text{ lbs/arm}$$

An occupant, 180 lbs., of this vehicle would experience a force starting at $t_o$ equal to zero and increasing sine wise to. 2.5 G in 0.143 sec.

$\theta_f$ is taken at 75° for illustration. The choice is arbitrary, but not imprudent. It is greater than $\theta_m$, undefined, and less than, say, 90°, a greater value than $\theta_m$. Recalling Equation (29), $$\theta = (E_o/K) \sin^2 \omega t$$

$$K = (1670.12/75) \sin^2 \omega t$$

$$K = 22.268 \sin^2 \omega t$$

$$K = 22.268 \text{ FT/LBS/Degree of Arc}$$

The shock absorber is thus determined as a rotary-shock having 22.168 Ft-LBS/Arc-Degree and a minimum rotation of 75°. It is also evident that $$\theta° = 75 \sin^2 \omega t$$

Using the notation $\theta_n°$ where the subscript $n$ corresponds in degree mode to the equivalent degree value given in radian measure by $\omega t$, values of $\theta_n°$ are readily computed from above to be:

$\theta°_o = 0; \theta_{15}° = 5.02°; \theta_{30}° = 18.75°; \theta_{45}° = 37.5° \theta_{60}°$
$\theta°_{60} = 56.25°; \theta_{75}° = 69.98°; \theta_{90}° = 75°$ Let a translucent surface now be prepared to the same scale as FIG. 5. This is to be an overlay to FIG. 5, 2nd is shown in FIG. 6. Trace the base line through ⊙ parallel to the impinging front. Draw through ⊙ a 30" line at an angle of 19.471°. Using this last line as origin, in a counter clock-wise direction, drawn through ⊙ on the overlay successive radia having angles to the new origin corresponding to $\theta_n°$ as computed. After these lines are drawn, place a thumb tack or other convenient pivot point through ⊙ from the overlay. Rotate the overlay clock-wise about ⊙ to the first radia after the new origin as described. In this example, the rotation will be 5.02°. Trace on the overlay the horizontal line on the underlay corresponding to 15°. Continue this process until all radia are so treated. A smooth curve tangent to the traced lines now fullfills all prescribed conditions for sinusoidal stopping according to Equation (1).

EXAMPLE B - Sinusoidal Energy Absorption

By Definition:

$$\Delta e = E_o \sin \omega t. \quad (1)$$

This reduces matters to a quick and easy solution. Recalling Equation (A-29), $$\theta_n° = (E_o/K) \sin \omega t \approx (E_o/K) \sin N° \quad (2)$$

Successive values of $\theta_n°$ now become for the example given under I-A, $\theta_o° = 0; \theta_{15}° = 19.41°; \theta_{30}° = 37.5°; \theta_{45}° = 53.03°;$
$\theta_{60}° = 64.95°; \theta_{75}° = 72.44°; \theta_{90}° = 75°$ Using these values for $\theta_n°$, following procedures as given in Ex. 1, the contour of the arm is given. As contrasted to Ex. 1, differences between parallel lines on the undelayment now represent different energy values. The value of $\omega$ remains the same; consequently, $t_f$ is the same.

Forces change: The remaining energy $e_R$, is the difference as before between the initial energy, a constant, and the absorbed energy, a variable.

$$e_R = E_o - E_o \sin \omega t. \tag{3}$$

Since the instantaneous energy $e_R$ is at all times $t$ equal to $\frac{1}{2} MV^2$ where V is the instantaneous velocity, $$\tfrac{1}{2} MV^2 = \tfrac{1}{2} MV^2_o (1 - \sin \omega t) \tag{4}$$

using positive sq. roots, $$V = V_o \sqrt{1 - \sin \omega t} \tag{5}$$

By differentiation with respect to $t$, $$(dv/dt) = \tfrac{1}{2} V_o (1 - \sin \omega t) - \tfrac{1}{2} (\omega \cos \omega t) \tag{6}$$

As before, $F = M(dv/dt)$, so that $$F = \frac{-M \cdot V_o \cdot \omega}{2} \left[ \frac{\cos \omega t}{(1 - \sin \omega t)^{\frac{1}{2}}} \right] \tag{7}$$

The expression within the brackets is indeterminate in current form since for $\omega t = \pi/2$, $\cos \omega t = 0$, $\sin \omega t = 1$, and the indeterminate expression arises; however, by slight simplification, the bracket value can be reduced to a limiting value of $\sqrt{2}$. Thus, let $\cos \omega t$ be replaced by $\sqrt{1-\sin^2 \omega t}$. Let $(1-\sin^2 \omega t)$ be factored to $(1-\sin \omega t)(1+\sin \omega t)$.

By substitution in Equation (7), $$F = \frac{-MV\omega}{2} \sqrt{\frac{(1 - \sin \omega t)(1 + \sin \omega t)}{(1 - \sin \omega t)}} \tag{8}$$

$$F = \frac{-MV\omega}{2} \sqrt{1 + \sin \omega t} \tag{9}$$

At $\pi/2$ radians or 90°, this reduces to $$F = (-M \cdot V_o \cdot \omega/2) \sqrt{2} = (-MV_o\omega/\sqrt{2}) \tag{10}$$

Using engineering units, per arm, $$F = (2000/3.2) \times (7.333 \sqrt{2}) \times (7.333/\tfrac{1}{2}) = 3542.53 \text{ lbs.} \tag{11}$$

The sinusoidal energy absorption arm gives in an equivalent time $t_f$ for the 180 lb. occupant a final "G" force of 1.77 G. At the beginning, however, under Ex. 1, the force at the point of impact is 0; whereas, under Ex. 2, the force tending to decelerate the vehicle is $(M \cdot V_o \cdot \omega/2)$ or $F = (2000/32.2) \times (7.333^2/4) \times 3 = 2504.95$ lbs. This amounts for the occupant of 180 lbs, 1.25 G or 225 lbs. force on the occupant.

Other Conditions

The foregoing has illustrated both mathematically and graphically procedures to be followed using the energy absorption device for given defined conditions. The defined conditions may vary from sine displacement to sine energy absorption; at any rate, once the specifications are given in mathematical form, procedures as used in Ex. 1 and Ex. 2 will still prevail. If for example, the deceleration shall be parabolic, only the parabola desired, $S$ and $E_o$ are required. In general, if it is required to stop an object per a given $f(x)$, all that is required is that $f(x)$ be continuous and possess 1st and 2nd derivatives. Sines, cosines, parabolas, hyperbolas, cycloids, etc. fall into this category.

What is claimed is:

1. Device for cushioning the impact of a first article against a second article when said articles approach each other along a predetermined straight path, said first article having a substantially straight leading edge substantially perpendicular to said path, and said device comprising:
    a lever arm having a curved surface,
    energy absorbing means,
    pivot means intermediate the ends of said lever arm connecting said lever arm to said energy absorbing means,
    means for pivotally connecting a first end of said lever arm to said second article with the lever arm extending transversely across said path and said curved surface facing said first article so that said leading edge contacts a point on said curved surface as said articles approach each other and swings said lever arm against the resistance of said energy absorbing means between a first position in which said point of contact is closer to the other end of said lever arm than to said intermediate pivot means and a second position in which it is not and thereby causes absorption of energy by said energy absorbing means,
    the curvature of said curved surface being such that the contact between said leading edge and curved surface is essentially a rolling contact as said lever arm moves from said first position to said second position.

2. Device as claimed in claim 1 in which said intermediate pivot means is nearer said first end of said lever arm than said other end of said lever arm.

3. Device as claimed in claim 8 in which said energy absorbing means is a shock-absorber having two relatively movable members, one of which is attached to said inermediate pivot means and the other of which is connected to said second article.

4. Device as claimed in claim 3 in which said second article is a stationary receiving member.

5. Device as claimed in claim 1 comprising two lever arms mounted with their first ends further apart than their other ends.

6. Device as claimed in claim 1 in which said curved surface so alters the distance between its point of contact with said first article as said lever arm moves from its first to its second position that a curve representative of the kinetic energy of and article being absorbed by said energy absorbing means is sinusoidal.

7. Device as claimed in claim 1 in which said curved surface so alters the distance between its point of contact with said first article as said lever arm moves from its first to its second position that a curve representative of the relationship between the distance required to stop an article and the kinetic energy of said article is sinusoidal.

* * * * *